3,455,996
PROCESS FOR PREPARING ACRYLIC ESTERS OF TRICHLOROPROPYLENE GLYCOL

William K. Langdon, Grosse Ile, and Alexander Korczak, Southgate, Mich., assignors to Wyandotte Chemicals Corporation, Wyandotte, Mich., a corporation of Michigan
No Drawing. Filed Mar. 17, 1966, Ser. No. 535,023
Int. Cl. C07c 67/00, 69/62, 69/54
U.S. Cl. 260—486                                    7 Claims

ABSTRACT OF THE DISCLOSURE

A process for preparing an ester by reacting in the presence of an aluminum isopropoxide catalyst:
(1) A vicinal alkylene oxide containing from 3 to 4 carbon atoms, inclusive, and having an alkyl group attached to a carbon atom of the oxirane ring said alkyl group having up to 2 carbon atoms and containing at least 2 halogen atoms each halogen atom having an atomic weight of 19 to 80, inclusive, and
(2) An acid selected from the group consisting of acrylic acid and methacrylic acid.

---

This invention relates to halogenated acrylic acid esters, also referred to as acrylates and, more particularly, to a novel catalyst for the production of such esters.

Processes for the preparation of acrylate esters by reacting acrylic acid or methacrylic acid with an alkylene oxide in the presence of an alkali or alkaline earth metal salt catalyst are known in the prior art. The commercial potentialities in industrial uses of such esters are well recognized. However, while these materials are well suited for many purposes, in general, the prior art acrylate esters have a major disadvantage and, consequently, a factor which limits the area of their potential use in that they are flammable and burn readily. Safety requirements, as imposed by insurance underwriters and civic ordinances, dictate that materials more resistant to fire be used for many applications.

Accordingly, it is a purpose of this invention to provide a process for preparing a class of acrylic acid esters which are characterized by excellent physical properties whereby they are useful for the many purposes for which acrylates are known, which are also useful as intermediates for the production of other esters, and which are useful in the preparation of compositions which have a relatively high order of nonflammability, which, in many cases, are nonburning and which compositions may be polymerized and cross-linked to provide new and useful plastic-type products.

It has now been found that the foregoing and additional purposes are accomplished by reacting in the presence of an aluminum isopropoxide catalyst:
(1) a vicinal alkylene oxide containing from 3 to 4 carbon atoms, inclusive, and having an alkyl group attached to a carbon atom of the oxirane ring, said alkyl group having up to 2 carbon atoms and containing at least 2 halogen atoms, each halogen atom having an atomic weight of 19 to 80, inclusive, and
(2) An acid selected from the group consisting of acrylic acid and methacrylic acid.

The products produced by the process of this invention are particularly useful as monomers to prepare nonburning, clear plastics by vinyl-type polymerization. They can also be cross-linked with unsaturated monomers to give hard plastics which have properties comparable or superior to those of commercially available polyester plastics. These products are also useful as intermediates for carbonate esters prepared by reactions with phosgene which products, in turn, are useful for preparing nonburning, thermosetting clear plastics.

Only small amounts of the catalyst are needed to effect a substantially complete reaction in a short time. Satisfactory results are ordinarily obtained with catalyst concentrations of from a few tenths of one percent to one percent or more based on the total weight of the reactants. If desired, more or less than this amount may be used even up to a relatively uneconomic 10 percent by weight of reactants. Thus, the catalyst can be employed in a range from about 0.01 percent to 10 percent by weight.

Representative polyhalogenous alkylene oxides used to prepare the polyesters of the present invention are 1,1-dichloro-2,3-epoxypropane,
1,1,1-trichloro-2,3-epoxypropane,
1,1,1-trifluoro-2,3-epoxypropane,
1-bromo-1,1-dichloro-2,3-epoxypropane,
other mixed 1,1,1-trihalo-2,3-epoxypropanes,
1,1,1-trichloro-3,4-epoxybutane,
1,1-difluoro-1-chloro-2,3-epoxypropane,
1,1-dichloro-1-fluoro-2,3-epoxypropane,
1,1,1-tribromo-3,4-epoxybutane,
1,2-dibromo-3,4-epoxybutane,
1,1,1,2,2-pentachloro-3,4-epoxybutane,
1,1,1,2,2-pentafluoro-3,4-epoxybutane,
1,1,1,2,2-mixed pentahalo-3,4-epoxybutanes, et cetera. Preferably, all of the valences of the terminal carbon atom of the alkyl group are satisfied by halogen atoms, or alternatively the halogen atoms present are preferably present on the terminal carbon atom of the alkyl group.

Any halogen or combination of halogens may be present in the starting polyhalogenous alklyene oxide. Of the halogens, chlorine, fluorine and bromine are preferred and the preferred halogens therefore have an atomic weight of 19 to 80, inclusive. In general, the higher the halogen content incorporated into the polyester, the better the overall fire resistance and chemical resistance of the polyester products. For this reason, starting alkylene oxides containing more than two halogen atoms on the alkyl substituent of the oxirane ring are preferred over the corresponding alkylene oxides containing only two halogen atoms. By way of example, 3,3,3 - trichloropropylene, oxide, which contains 3 halogen atoms on the polyhalogenoalkyl group, is preferred over the corresponding dihalogenolkylene oxide, 3,3-dichloropropylene oxide.

In the formation of the esters in accordance with the present invention, it is possible to vary the proportion of reactants over a wide range. That is, both of the reactants can be used in stoichiometrically equivalent amounts or either can be used in large excess. An excess of about 50 percent of the polyhalogenous alkylene oxide above the stoichiometric proportions has been found to be most desirable for performing the process of this invention. Ordinarily, molar ratios of polyhalogenous alkylene oxide to the acrylic acid or methacrylic acid of about 1:1 to about 3:1 are preferred, although, if desired, ratios as high as 6:1 or even higher may be successfully employed. Also, ratios as low as 1:2 may be employed.

The esters are generally formed by heating and reacting the polyhalogenous alkylene oxide with the acrylic or methacrylic acid in the presence of the catalyst at an elevated temperature, a temperature of at least about 50° C. being preferred in order to complete the reaction in a reasonably short period of time, e.g., 1 to 2 hours. Higher temperatures may be employed although temperatures in excess of about 200° C. generally are not employed. A solventless system may be employed in conducting the reaction or a solvent may be employed. When it is desired to use a solvent, nonaqueous or substantially nonaqueous organic solvents and solvents which are unreactive with the reactants and products of the reaction are preferred. These include hydrocarbons such as benzene, toluene, hexane, et cetera; and halohydrocarbons such as halobenzenes, e.g., chlorobenzene, halotoluenes aliphatic halohydrocarbons such as high-boiling polyhalomethanes, et cetera. With low-boiling solvents it may be necessary to conduct the reaction under greater than atmospheric pressure, but normally atmospheric pressure is preferred since the use of increased pressure, although operative, sometimes makes control of the exothermic heat of reaction difficult. The reaction may be advantageously conducted under an inert atmosphere, as of nitrogen or carbon dioxide. The use of such an inert atmosphere usually improves the overall color of the product.

Any of several different general procedures may be used in carrying out the reaction between the starting polyhalogenous alkylene oxide and the acid. The oxide, acrylic or methacrylic acid and reaction catalyst, if any, can all be mixed at once and the reaction mixture heated to the desired temperature range. The reaction between the alkylene oxide and acrylic or methacrylic acid is exothermic at reaction temperatures so that considerable heat may evolve and maintain the desired temperature for a period within additional external heating, and may even require external cooling. It is possible to take advantage of the exothermic heat of reaction by adding one or more of the reactants to the reaction mixture portionwise at such a rate that the desired reaction temperature is maintained.

The time necessary to react the polyhalogenous alkylene oxide and the acrylic acid or methacrylic acid can vary between 30 minutes and 9 hours, depending upon the specific reactants, temperature, etc., employed. The reaction is considered complete when there are no volatiles left in the reaction mixture or when the amount of volatiles in the reaction mixture levels off to a constant minimum.

As stated above, the product as produced in accordance with the present invention may be beneficially used for a variety of purposes, including most applications where commercial polyesters are currently being used, but giving products with superior fire and chemical resistance. They range from liquids to rubbery elastomers to hard, strong plastics. These products can be used for variety of purposes in such diversified fields as adhesives, coatings, and the like. They can be polymerized and cross-linked with various ethylenically unsaturated cross-linking agents to yield materials useful in a wide variety of applications including flexible and rigid coatings, elastomers, rubbers, soft-to-hard plastics, etc., all having a high degree of nonflammability and chemical resistance and, in many cases, even being nonburning. Physical properties of these ester materials may be upgraded by the addition, according to well-known procedures, of some auxiliary, natural or synthetic materials such as glass fibers, asbestos, sisal, cotton, nylon (polyamide and polyester), wood and pigment fillers, etc., to give reinforced plastics and laminates of superior strength and a high degree of nonflammability. In addition, these esters, particularly when polymerized to form polyesters, may be mixed with certain drying oils such as linseed oil and perilla oil and coated on a surface to undergo oxidative non-linking or polymerization to give tough, elastic, weather and chemical resistant air-drying films which have improved fire resistance. Additional uses and modifications of the stated uses will be readily apparent to one skilled in the art.

An ester prepared from 3,3,3-trichloropropylene oxide and either acrylic acid or methacrylic acid in a molar ratio of about 1:1 to about 1.5:1 in the presence of an aluminum isopropoxide catalyst is of particular interest and value and therefore represents preferred embodiments of the invention.

The practice of this invention will be more completely understood by reference to the following examples.

EXAMPLES

A series of esters is prepared by charging polyhalogenous alkylene oxide and aluminum isopropoxide catalyst, as shown in the table below, along with 1 gram of 4-tertiary butyl catechol inhibitor to a 3-liter, round-bottom flask equipped with a mechanical stirrer and thermometer. Acrylic or methacrylic acid is then gradually added from a dropping funnel, the total amount and kind of acid being shown in the table below. The reaction temperature is maintained below the maximum shown in the table, first, by controlling the rate of addition of the acid from the dropping funnel and, later, by cooling with water, i.e., running water around the outside of the flask. After completion of the reaction, the catalyst is removed from the crude mixture by treatment, according to the methods described below, with tartaric acid, sulfuric acid, or hydrochloric acid as indicated in the table.

More specifically, in the tartaric acid treatment, the crude material is washed twice with warm 10 percent tartaric acid solution, followed by two water rinses and extraction of the organic material from the water layer by methylene chloride.

In the sulfuric acid treatment, the crude material is treated with 50 percent aqueous sulfuric acid solution, followed by neutralization with sodium bicarbonate and filtering using a Buchner funnel.

The hydrochloric acid treatment is the same as the sulfuric acid treatment with the exception that concentrated hydrochloric acid solution is substituted for the sulfuric acid.

After catalyst removal, the desired ester product is isolated from the crude reaction mixture by flash distillation.

The calculations for the percentage conversions in the table below are based on the amount of methacrylic or acrylic acid initially employed.

TABLE

| Example No. | Alkylene Oxide Kind | Grams | Acid Kind | Grams | Alkylene oxide: acid mol ratio | Catalyst, grams | Max. reaction temp., °C. | Reaction time, minutes | Catalyst removal treatment | Percent conversion |
|---|---|---|---|---|---|---|---|---|---|---|
| 1 | 3,3,3-trichloropropylene oxide. | 242.5 | Methacrylic | 86 | 1.5:1 | 28.2 | 98 | 90 | Tartaric acid | 82 |
| 2 | do | 1,212 | do | 431 | 1.5:1 | 141 | 94 | 70 | do | 87 |
| 3 | do | 1,212 | do | 431 | 1.5:1 | 141 | 94 | 70 | do | 89 |
| 4 | do | 727 | Acrylic | 216 | 1.5:1 | 84 | 84 | 80 | do | 90 |
| 5 | do | 484.5 | Methacrylic | 172 | 1.5:1 | 29 | 154 | 100 | do | 91 |
| 6 | do | 242.5 | do | 86 | 1.5:1 | 14 | 90 | 85 | do | 91 |
| 7 | do | 484.5 | do | 172 | 1.5:1 | 29 | 96 | 90 | do | 90 |
| 8 | do | 484.5 | do | 172 | 1.5:1 | 29 | 91 | 95 | Sulfuric acid | 86 |
| 9 | do | 484.5 | do | 172 | 1.5:1 | 29 | 93 | 100 | do | 89 |
| 10 | do | 484.5 | do | 172 | 1.5:1 | 29 | 90 | 95 | Hydrochloric | 82 |
| 11 | do | 484.5 | do | 172 | 1.5:1 | 29 | 90 | 100 | do | 86 |
| 12 | do | 484.5 | do | 172 | 1.5:1 | 29 | 100 | 80 | Sulfuric acid | 71 |
| 13 | 1,1-dichloro-2,3-epoxypropane. | 190.5 | do | 86 | 1.5:1 | 11 | 100 | 85 | Hydrochloric | 90 |
| 14 | 1,1,1-trifluoro-2,3-epoxypropane. | 168 | do | 86 | 1.5:1 | 9.7 | 100 | 90 | do | 90 |
| 15 | 1-bromo-1,1-dichloro-2,3-epoxypropane. | 309 | do | 86 | 1.5:1 | 17.9 | 100 | 70 | do | 90 |
| 16 | 1,1,1-trichloro-3,4-epoxybutane. | 264 | do | 86 | 1.5:1 | 15.3 | 100 | 75 | do | 90 |

TABLE—Continued

| Example No. | Alkylene Oxide Kind | Grams | Acid Kind | Grams | Alkylene oxide: acid mol ratio | Catalyst, grams | Max. reaction temp., °C. | Reaction time, minutes | Catalyst removal treatment | Percent conversion |
|---|---|---|---|---|---|---|---|---|---|---|
| 17 | 1,1-difluoro-1-chloro-2,3-epoxypropane. | 193 | do | 86 | 1.5:1 | 11.2 | 100 | 80 | do | 90 |
| 18 | 1,1-dichloro-1-fluoro-2,3-epoxypropane. | 217 | do | 86 | 1.5:1 | 12.6 | 100 | 85 | do | 90 |
| 19 | 1,1,1-tribromo-3,4-epoxybutane. | 464 | do | 86 | 1.5:1 | 27 | 100 | 90 | do | 90 |
| 20 | 1,2-dibromo-3,4-epoxybutane. | 345 | do | 86 | 1.5:1 | 20 | 100 | 80 | do | 90 |
| 21 | 1,1,1,2,2-pentachloro-3,4-epoxybutane. | 367 | do | 86 | 1.5:1 | 21 | 100 | 85 | do | 90 |

It is to be understood that various changes and modifications may be made in the foregoing process without departing from the spirit of the invention and scope of the appended claims.

What is claimed is:

1. A process for preparing an ester comprising reacting at a temperature of from about 50 to 200° C. in the presence of an aluminum isopropoxide catalyst.
   (1) a vicinal alkylene oxide containing from 3 to 4 carbon atoms, inclusive, and having an alkyl group attached to a carbon atom of the oxirane ring, said alkyl group having up to 2 carbon atoms and containing at least 2 halogen atoms, each halogen atom having an atomic weight of 19 to 80, inclusive, and
   (2) an acid selected from the group consisting of acrylic acid and methacrylic acid, said vicinal alkylene oxide and said acid being reacted in a molar ratio of about 1:2 to about 6:1 and the amount of said catalyst being from about 0.01 to 10 percent of the total weight of the reactants.

2. The process of claim 1 wherein said alkylene oxide is a 3,3,3-trihalopropylene oxide.

3. The process of claim 1 wherein said alkylene oxide is a 3,3,3-trichloropropylene oxide.

4. The process of claim 1 wherein said alkylene oxide is a 3,3-dihaloalkylene oxide.

5. The process of claim 1 where said alkylene oxide is a 3,3-dichloropropylene oxide.

6. The process of claim 1 wherein said acid is acrylic acid.

7. The process of claim 1 wherein said acid is methacrylic acid.

References Cited

UNITED STATES PATENTS

| 2,962,524 | 11/1960 | Hostettler et al. | 260—484 |
| 3,150,167 | 9/1964 | Wright et al. | 260—486 |
| 3,244,754 | 4/1966 | Bruson et al. | 260—615 |
| 3,254,057 | 5/1966 | Davis | 260—78.4 |
| 3,313,846 | 4/1967 | Slovinsky | 260—484 |
| 3,331,815 | 7/1967 | Kokorudz et al | 260—78.4 |

LORRAINE A. WEINBERGER, Primary Examiner

ALBERT P. HALLUIN, Assistant Examiner

U.S. Cl. X.R.

260—86.1, 89.5